(12) United States Patent
Joseph et al.

(10) Patent No.: US 9,230,214 B1
(45) Date of Patent: Jan. 5, 2016

(54) PERSONALIZING AUTO-COMPLETION RESULTS BASED ON USER INTENT

(71) Applicant: INTUIT INC., Mountain View, CA (US)

(72) Inventors: Sony Joseph, Mountain View, CA (US); Ilya A. Izrailevsky, Sunnyvale, CA (US); Sunil K. Tripathy, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 163 days.

(21) Appl. No.: 13/957,706

(22) Filed: Aug. 2, 2013

(51) Int. Cl.
*G06F 17/00* (2006.01)
*G06N 5/02* (2006.01)
*G06N 5/04* (2006.01)
*G06N 99/00* (2010.01)

(52) U.S. Cl.
CPC .. *G06N 5/02* (2013.01); *G06N 5/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,377,965 B1 * | 4/2002 | Hachamovitch et al. | 715/203 |
| 6,564,213 B1 * | 5/2003 | Ortega et al. | |
| 7,181,438 B1 * | 2/2007 | Szabo | |
| 8,347,222 B2 * | 1/2013 | Raguseo | 715/780 |
| 2008/0065617 A1 * | 3/2008 | Burke et al. | 707/5 |

OTHER PUBLICATIONS

Learning to Personalize Query Auto-Completion Milad Shokouhi Microsoft Cambridge, United Kingdom milads@microsoft.com SIGIR'13, Jul. 28-Aug. 1, 2013, Dublin, Ireland.*
Designing Phrase Builder: A Mobile Real-Time Query Expansion Interface Tim Paek, Bongshin Lee, Bo Thiesson Microsoft Research One Microsoft Way Redmond, WA 98052, USA {timpaek, bongshin, thiesson}@microsoft.com MobileHCI'09, Sep. 15-18, 2009, Bonn, Germany.*

* cited by examiner

*Primary Examiner* — Kakali Chaki
*Assistant Examiner* — Ababacar Seck
(74) *Attorney, Agent, or Firm* — Park, Vaughan, Fleming & Dowler LLP

(57) ABSTRACT

Some embodiments provide a system that facilitates use of an auto-completion system. During operation, the system receives an input text string entered by a user. The system determines a set of text strings, wherein each of the text strings in the set can replace the input text string entered by the user. Next, the system calculates a commercial intent score for each text string in the set. Following this, the system selects a replacement text string from the set of text strings based on commercial intent scores computed for each text string in the set. Finally, the system displays the selected replacement text string in the place of the input text string to the user.

16 Claims, 3 Drawing Sheets

PERSONALIZING AUTO-COMPLETION RESULTS BASED ON USER INTENT

BACKGROUND

The present disclosure generally relates to techniques for facilitating auto-completion of text strings that are entered by a user. More specifically, the present disclosure relates to a technique for obtaining text strings that can replace a partial text string entered by a user based on a determined intent of the user.

SUMMARY

The described embodiments relate to an auto-completion system for user-entered text strings. During operation, the system receives an input text string from a user. The system then determines a set of potential replacement text strings, wherein each replacement text string in the set can replace the input text string. Next, the system calculates a commercial intent score for each text string in the set. Following this, the system selects a replacement text string from the set of text strings based on the computed commercial intent score for each text string in the set. Finally, the system displays the second text string in place of the first text string to the user.

In some embodiments, the first text string comprises a customer or vendor name entered by the user.

In some embodiments, determining the set of potential replacement text strings for the first text string involves first retrieving, from a database, prior financial transactions conducted by the user with a set of businesses. Following this, the system analyzes the retrieved prior financial transactions. Then, the system identifies, from the set of businesses, the set of potential replacement text strings, wherein each text string in the set is identified based on the analysis.

In some embodiments, the determination of each potential replacement text string is further based on establishing a level of lexicographic matching of the potential replacement text string with the first text string.

In some embodiments, analyzing the retrieved prior financial transactions involves retrieving information about each business in the set of businesses, and determining characteristics associated with each business based on the retrieved information.

In some embodiments, the information about each business in the set of businesses is retrieved from a third-party database.

In some embodiments, the characteristics associated with the businesses comprise one or more of: the frequency of association of the business with the user, the start time of association of the business with the user, length of time of association of the business with the user, the category of the business, the size of the business, and location of the business.

In some embodiments described herein, the commercial intent score for each potential replacement text string in the set is based on least one of: a normalized value Category(u,b) of the category of the business b for the user u; a normalized value Size(u,b) of the size of the business b for the user u; and a normalized value Distance(u,b) of the distance of the business b for the user u.

In some embodiments described herein, calculating Category(u,b) involves performing the operation:

Category(u,b)=TF(Category(b) in Category(u))×IDF(Category(b)), where

TF(Category(b) in Category(u))=sqrt(TermFrequency (Category(b) in Category(u))), IDF(Category(b))=1+log(N/(N(Category(b))+1, Category(b)=category of business b, Category(u)=categories from user u's transaction history, TermFrequency(Category(b) in Category(u))=number of times category of business b occurs in user u's transaction categories, N=total number of users, and N(Category(b))=number of users who have used Category (b) at least once.

In some embodiments described herein, calculating Size (u,b) involves performing the operation:

Size(u,b)=NormalizedAcrossUsersSize(u,b)×NormalizedAcrossBusinessesSize(u,b), where NormalizedAcrossUsersSize(u,b)=log(1+S(b)/S_avg(u)+ 1), NormalizedAcrossBusinessesSize(u,b)=S(b)/S_avg, S(b)=size/number of employees of business b, S_avg(u)=average size/no. of employees of businesses with whom the user u, conducted transactions, and S_avg=average size/number of employees at all known businesses.

In some embodiments described herein, calculating Distance(u,b) involves performing the operation:

Distance(u,b)=NormalizedAcrossUsersDistance(u,b)× NormalizedAcrossBusinessesDistance(u,b), where NormalizedAcrossUsersDistance(u,b)=log(1+D(u,b)/ D_avg(b)), NormalizedAcrossBusinessesDistance(u,b)=D(u,b)/ D_avg(u), D(u,b)=distance between user u and business b, D_avg(b)=average distance between business b and all users who transacted with business b, and D_avg(u)=average distance between user u and all businesses with whom the user u conducted transactions.

In some embodiments, calculating the commercial intent score further involves ranking each text string in the set of potential replacement text strings based on the commercial intent score for the text string, and ordering the text strings in the set of potential replacement text strings based on the ranking.

In some embodiments, the system displays one or more text strings from the set of potential replacement text strings as suggestions for selection by the user to replace the first text string.

In some embodiments, the system receives a selection from the user, and replaces the first text string with the selection.

In some embodiments, prior to receiving the input text string from the user, the system displays an auto-completion configuration window to the user, and receives configuration parameters comprising a selection of business characteristics of businesses to be used in calculating a commercial intent score for each potential replacement text string.

In some embodiments, the calculation of the commercial intent score for each potential replacement text string in the set is based on the received configuration parameters.

In some embodiments, displaying an auto-completion configuration window to the user further involves displaying a window with a list of configuration parameters for individual selection by the user.

Other embodiments provide a non-transitory computer-readable storage medium and a computer system that facilitate the use of an auto-completion system in accordance with described embodiments.

BRIEF DESCRIPTION OF THE FIGURES

In the figures, like reference numerals refer to the same figure elements.

DETAILED DESCRIPTION

Figure 1:
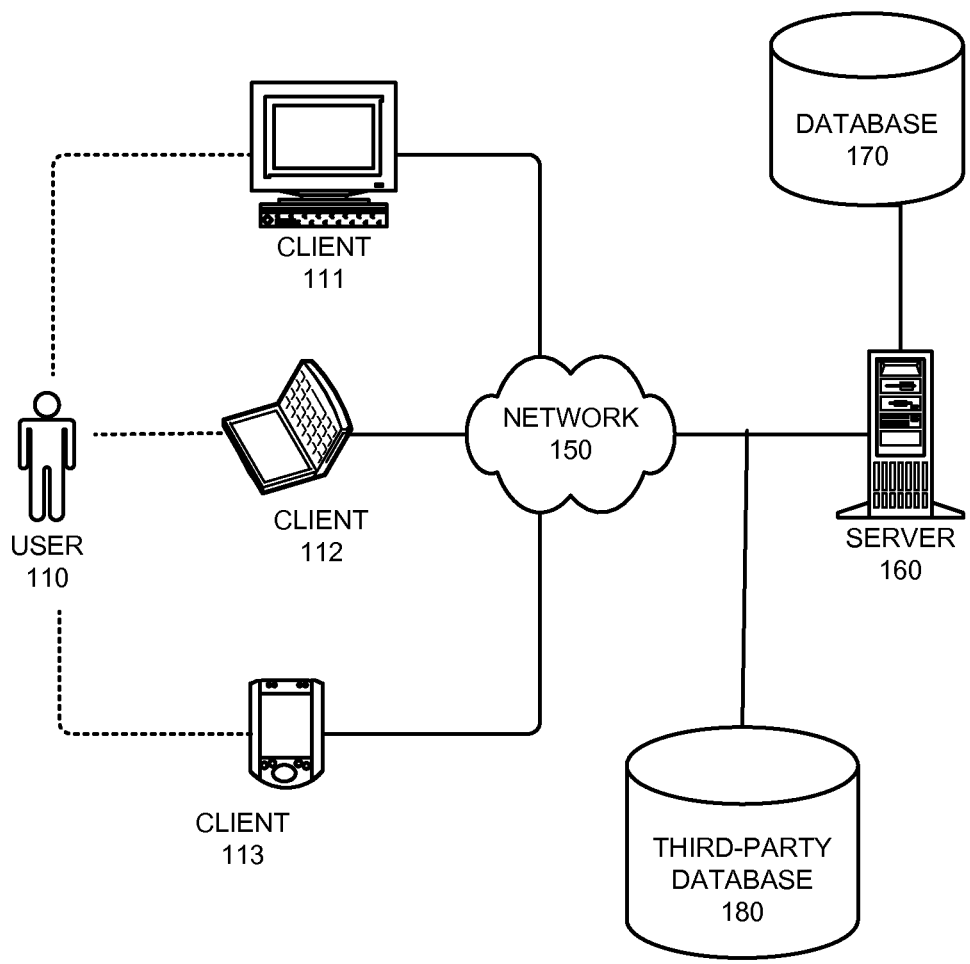
FIG. 1 illustrates a computing environment in accordance with some described embodiments.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored in a non-transitory computer-readable storage medium as described above. When a computer system reads and executes the code and/or data stored on the computer-readable storage medium, the computer system perform the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

While running software applications, a user often fills out a form by entering data into fields. Typically, when financial applications are used to run a customer or vendor registration process, the user will complete a registration form that involves entering the name of a business associated with the customer or vendor.

As users type in the business name, an auto-completion process in the application may suggest a set of names that a user may be trying to enter. The set of names is usually determined based on how close the typed word fragment entered by the user is to a suggested name in the merchant corpus or database against which the search may be conducted. The ordering of the suggestions may be based on the lexicographic closeness of the typed fragment to a suggestion, and/or be based on previous entries by the user.

An efficient auto-completion process within a software application is important because it improves the user's experience in interacting with the application by minimizing the amount of data that needs to be explicitly entered by the user in the course of running the application.

A typical example of an auto-completion process is as follows: Jane is a restaurateur using an application to create a new invoice of the first day of a week. As she fills in the invoice, she enters the text fragment "Joe". The system, in attempting to auto-complete the entered text string, might offer four potential results, any of which could potentially replace the entered text string, "Joe". The choices offered may be "Joe's Crab Shack", "Joseph Flowers, Inc.", "Josephine—Your Neighborhood Florist!", or "Jo Emmett Automotive Parts". The system might auto-fill the suggestion "Joe's Crab Shack" into the entry based on the lexicographic closeness of the suggestion with the typed text fragment, "Joe".

Personalizing Auto-Complete Entries

The embodiments described herein facilitate the auto-completion process while using a software application.

In some embodiments, the financial software application has access to a user's financial transactions. The system performs data mining on stored financial transactions of the user, analyzes the stored transaction data, and categorizes them, based on several parameters. This analysis is used to determine the commercial behavioral history of the user, and to leverage this history to infer the commercial intent behind a user's field entry of a business name fragment. The more accurate the system is in determining the commercial intent of the user, the more accurate will be the suggestions made while performing the auto-completion of a name fragment entry by the user.

In some embodiments, the system quantizes a user's commercial intent toward a business by associating the business's name with a commercial intent score. The commercial intent score associated with a business's name is then used to prioritize, rank, and/or shortlist a set of suggestions, any of which may then be used to replace the user-entered text fragment, and successfully auto-complete the entry on behalf of the user.

In some embodiments, the commercial intent score of a business b for a user u is used to generate a ranking or ordering for auto-complete suggestions.

In some embodiments, the commercial intent score CommercialIntent(u,b) of a business b for a user u is calculated as a summation of three elements. The three elements are: (i) the value of the category of the business Category(u,b) to the user, (ii) the value of the size of the business Size(u,b) to the user, and (iii) the value of the distance of the business Distance(u,b) to the user. Thus, CommercialIntent(u,b)=Category(u,b)+Size(u,b)+Distance(u,b).

Determining the value of the category of the business Category(u,b) to the user involves determining the number of times business b's category appears in user u's transactional history. However, this number is also offset by the frequency of occurrence of the category across all users. This helps to reflect the fact that some categories are too generic, or are more common than others in evaluating the importance of the category to a user. Thus, Category(u,b)=TF(Category(b) in Category(u))×IDE(Category(b)), where TF(Category(b) in Category(u))=sqrt(TermFrequency (Category(b) in Category(u))), and IDF(Category(b))=1+log(N/(N(Category(b))+1)).

Here,
- Category(b)=category of business b,
- Category(u)=categories from user u's transaction history,
- TermFrequency(Category(b) in Category(u))=number of times category of business b occurs in user u's transaction categories,
- N=total number of users, and
- N(Category(b))=number of users who have used Category (b) at least once.

Determining the value of the size of the business to the user Size(u,b) involves determining the number of times businesses with business b's size appear in user u's transactional history. This value is normalized not only across all users, but also across all businesses. Thus, Size(u,b)=NormalizedAcrossUsersSize(u,b)×NormalizedAcrossBusinessesSize(u,b), where
NormalizedAcrossUsersSize(u,b)=log(1+S(b)/S_avg(u)+1), and
NormalizedAcrossBusinessesSize(u,b)=S(b)/S_avg.

Here,
- S(b)=size/number of employees of business b,
- S_avg(u)=average size/no. of employees of businesses with whom the user u conducted transactions, and
- S_avg=average size/number of employees at all known businesses.

Determining the value of the distance of the business, Distance(u,b), to the user involves determining the number of times businesses with business b's distance from the user appear in user u's transactional history. This value is normalized not only across all users, but also across all businesses. Thus, Distance(u,b)=NormalizedAcrossUsersDistance(u,b)×NormalizedAcrossBusinessesDistance(u,b), where
NormalizedAcrossUsersDistance(u,b)=log(1+D(u,b)/D_avg(b)), and
NormalizedAcrossBusinessesDistance(u,b)=D(u,b)/D_avg(u).

Here,
- D(u,b)=distance between user u and business b,
- D_avg(b)=average distance between business b and all users who transacted with business b, and
- D_avg(u)=average distance between user u and all businesses with whom the user u conducted transactions.

Note that the above evaluation of the commercial intent score for a business involves obtaining metadata for businesses, such as the size of a business. In some embodiments, the system obtains such business data from third-party sources that accumulate business data for businesses either globally or locally. An example of such a third-party resource for business data information is Dun & Bradstreet®.

The above description evaluates the commercial intent score for a business based on obtaining the values of category, size, and distance of a business b relative to a user u. However, the evaluation of the commercial intent score for a business can be expanded to reflect the value of other commercial signals that can be mined for businesses. Examples of other commercial signals may be age of the business, stock value, annual revenue, types of clients, manufacturing details, etc., of a business. Again, third-party resources may be used to obtain such data.

Some embodiments will permit the user to specify one or more commercial signals to be included in determining the commercial intent score for a business. A commercial signal may be used to encourage selection of an associated business name during the auto-completion process by generating high commercial intent scores. A commercial signal may also be used to discourage selection of a particular business name during the auto-completion process by ranking it poorly in the list of suggestions made to the user for auto-completion. An example of the latter could be to reflect the user's intent to not conduct business with entities in specific geographic locales, or with businesses having specific client-lists.

Some embodiments include a pop-up or a pull-down list of suggested items for selection by the user. The list of suggested items may be ranked or ordered based on the determined commercial intent score associated with each item. The system may auto-complete the entry in the field by replacing the entered fragment from the user with the top item in the list. The system may alternatively wait for the user to indicate an entry for auto-completion by clicking on an item from the list of suggestions. The user may indicate a preferred suggestion by moving a mouse over an item, or touching the item on a touch-screen user-interface of a device running the application. The customer may also choose to ignore the suggestions, and enter new information into the provided customer input field.

Computing Environment

FIG. 1 illustrates a network in accordance with some embodiments described herein. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes a user 110, clients 111-113, network 150, server 160, database 170, and a third-party database 180.

Clients 111-113 can include any node on a network with computational capability and with a mechanism for communicating across the network. Additionally, clients 111-113 may comprise a tier in an n-tier application architecture, wherein clients 111-113 perform as servers (servicing requests from lower tiers or users), and wherein clients 111-113 perform as clients (forwarding the requests to a higher tier). Furthermore, a client can include any type of electronic device. This includes, but is not limited to, cell phones, personal digital assistants (PDAs), smartphones, personal music players (such as MP3 players), gaming systems, digital cameras, video cameras, portable storage media, or any other device that can be coupled to the client.

Similarly, a server 160 can generally include any node on a network including a mechanism for servicing requests from a client for computational and/or data storage resources. A server 160 can participate in an advanced computing cluster, or can act as a stand-alone server.

User 110 can include: an individual; a group of individuals; an organization; a group of organizations; a computing system; a group of computing systems; or any other entity that can interact with computing environment 100.

Network 150 can include any type of wired or wireless communication channel capable of coupling together computing nodes. This includes, but is not limited to, a local area network, a wide area network, or a combination of networks. In some embodiments described herein, network 150 includes the Internet. In some embodiments described herein, network 150 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 160), to a client, or directly to a network.

Third-party database 180 can include any type of system for storing data in non-volatile storage. This includes, but is not limited to, systems based upon magnetic, optical, or magneto-optical storage devices, as well as storage devices based on flash memory and/or battery-backed up memory. Note that database 180 can be coupled through a network to a server (such as server 160).

Note that different embodiments may use different system configurations, and are not limited to the system configuration illustrated in computing environment 100. In general, any device that is capable of communicating via network 150 may include embodiments described herein.

System

Figure 2:
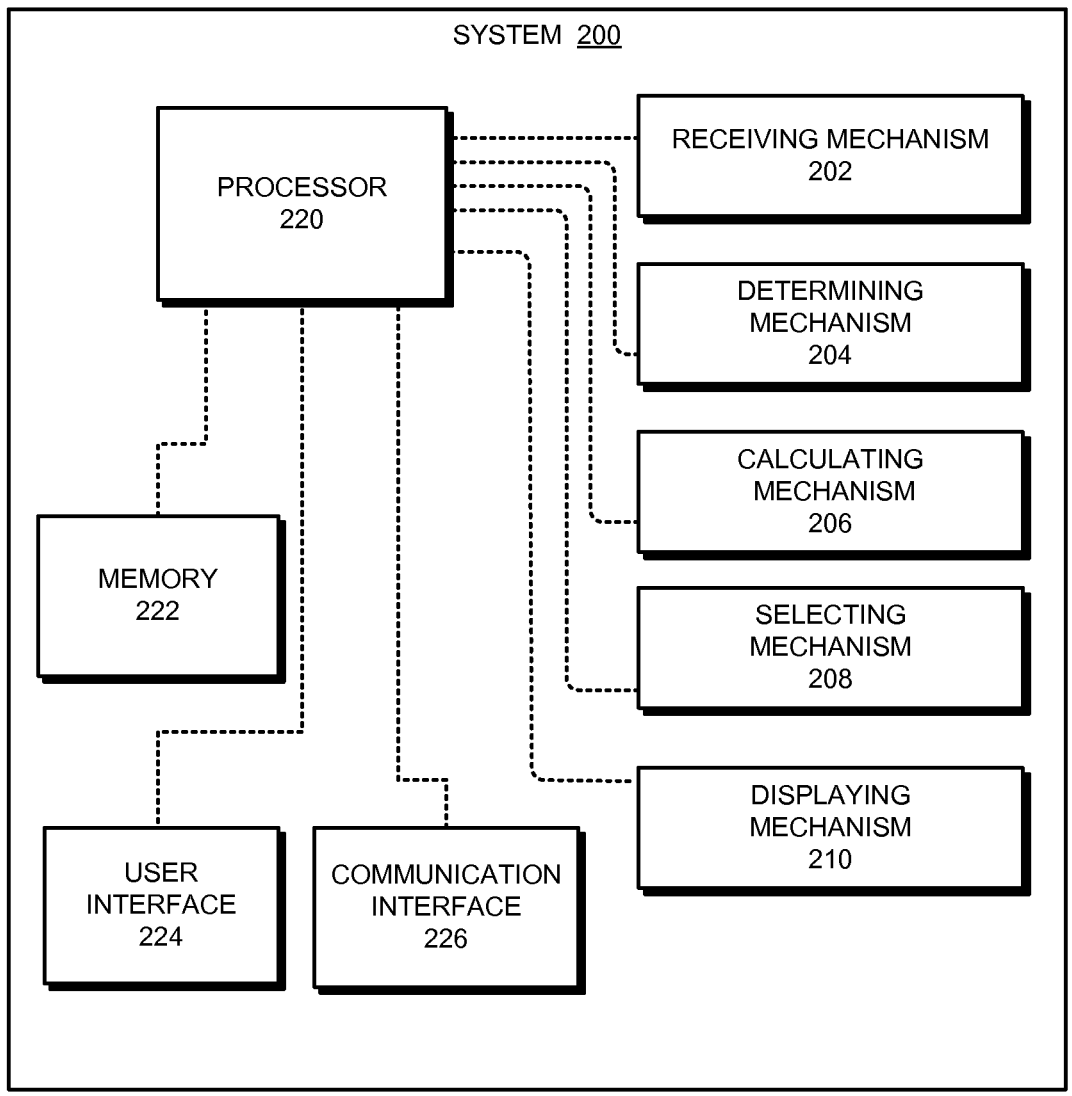
FIG. 2 illustrates a system in accordance with some described embodiments.

FIG. 2 illustrates a system 200 in accordance with some embodiments described herein. As illustrated in FIG. 2, system 200 can include processor 220, memory 222, user interface 224, communication interface 226, a receiving mechanism 202, a determining mechanism 204, a calculating mechanism 206, a selecting mechanism 208, and a displaying mechanism 210. System 200 can further comprise server 160, database 170, third-party database 180, clients 110-112, or any combination thereof.

Auto-Completion of User String Entry Based on User Intent

Figure 3:
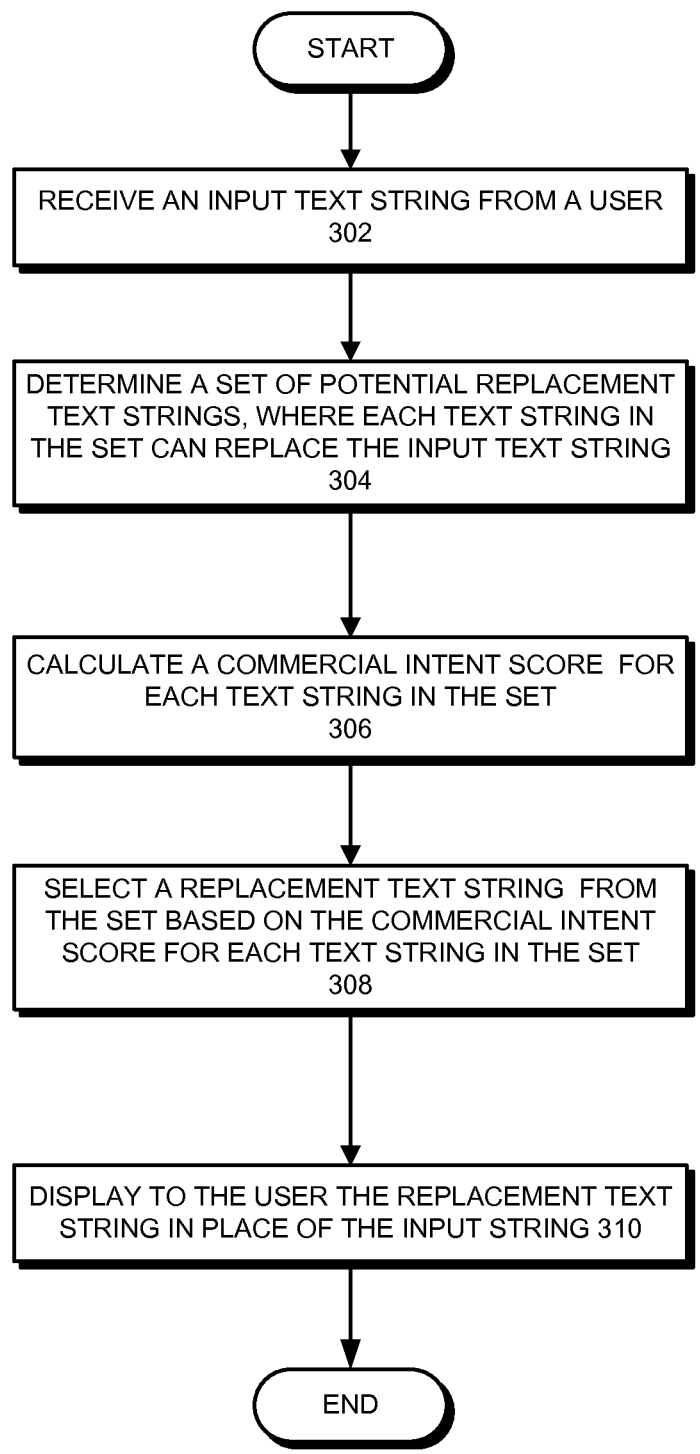
FIG. 3 presents a flowchart illustrating a technique for facilitating auto-completion of text strings that are entered by a user, in accordance with an embodiment.

FIG. 3 presents a flowchart illustrating the process of auto-completion of a text string entered by a user. During operation, a receiving mechanism 202 at a system 200 receives data, such as a text string fragment, entered by a user into an entry window, such as a field in a form, from a software application running on one of client devices 111-113 (operation 302). In response, a determining mechanism 204 determines a set of potential replacement text strings that may each be used to replace the text string entered by the user into the field (operation 304).

Next, a calculating mechanism 206 calculates a commercial intent score for each of the text strings in the set of potential replacement text strings (operation 306). Following this, based on the computed commercial intent score for each of the text strings in the set, a selecting mechanism 208 selects a replacement text string from the set of text strings to replace the text string previously entered by the user (operation 308). Finally, a displaying mechanism 210 displays the selected text string to the user in the entry window, replacing the text string that was entered by the user (operation 310).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating use of an auto-completion system, comprising:
    receiving an input text string from a user;
    determining a set of potential replacement text strings, wherein each potential replacement text string in the set can replace the input text string, wherein determining the set of potential replacement text strings for the input text string involves:
        retrieving, from a database, prior financial transactions conducted with a set of businesses by the user;
        analyzing the retrieved prior financial transactions; and
        identifying, from the set of businesses, the set of potential replacement text strings, wherein each potential replacement text string in the set of potential replacement text strings is further based on establishing a level of lexicographic match of the potential replacement text string with the first text string;
    calculating, by computer, a commercial intent score for each potential replacement text string in the set, wherein the commercial intent score for each potential replacement text string in the set is based on calculating at least one of:
        a normalized value Category(u,b) of the category of the business b for the user u;
        a normalized value Size(u,b) of the size of the business b for the user u; and
        a normalized value Distance(u,b) of the distance of the business b for the user u;
    selecting a replacement text string from the set of potential replacement text strings based on the computed commercial intent score for each text string in the set; and
    displaying the replacement text string in place of the input text string to the user.

2. The method of claim 1, wherein the input text string comprises a customer or vendor registration name entered by the user.

3. The method of claim 1, wherein analyzing the retrieved prior financial transactions involves:
    retrieving information about each business in the set of businesses; and
    determining characteristics associated with each business based on the retrieved information.

4. The method of claim 3, wherein the information about each business in the set of businesses is retrieved from a third-party database.

5. The method of claim 3, wherein the characteristics associated with the businesses comprise one or more of:
    a frequency of association of the business with the user;
    a start time of association of the business with the user;
    a length of time of association of the business with the user;
    a category of the business;
    a size of the business; and
    a location of the business.

6. The method of claim 1, wherein calculating Category(u, b) involves performing the following operation:
    Category(u,b)=TF(Category(b) in Category(u))×IDF(Category(b)), wherein
    TF(Category(b) in Category(u))=sqrt(TermFrequency(Category(b) in Category(u))),
    IDF(Category(b))=1+log(N/(N(Category(b))+1,
    Category(b)=category of business b,
    Category(u)=categories from user u's transaction history,
    TermFrequency(Category(b) in Category(u))=number of times category of business b occurs in user u's transaction categories,
    N=total number of users, and
    N(Category(b))=number of users who have used Category(b) at least once.

7. The method of claim 1, wherein calculating Size(u,b) involves performing the following operation:
    Size(u,b)=NormalizedAcrossUsersSize(u,b)×NormalizedAcrossBusinessesSize(u,b), wherein
    NormalizedAcrossUsersSize(u,b)=log(1+S(b)/S_avg(u)+1),
    NormalizedAcrossBusinessesSize(u,b)=S(b)/S_avg,
    S(b)=size/number of employees of business b,
    S_avg(u)=average size/no. of employees of businesses that user u transacts with, and
    S_avg=average size/number of employees at all known businesses.

8. The method of claim 1, wherein calculating Distance (u,b) involves performing the following operation:

Distance(u,b)=NormalizedAcrossUsersDistance(u,b)×
NormalizedAcrossBusinessesDistance(u,b), wherein
NormalizedAcrossUsersDistance(u,b)=log(1+D(u,b)/D_avg(b)),
NormalizedAcrossBusinessesDistance(u,b)=D(u,b)/D_avg(u),
D(u,b)=distance between user u and business b,
D_avg(b)=average distance between business b and all users who transacted with business b, and
D_avg(u)=average distance between user u and all businesses that user u transacted with.

9. The method of claim 1, wherein calculating the commercial intent score further involves:
ranking each potential replacement text string in the set based on the computed commercial intent score for the potential replacement text string; and
ordering the potential replacement text string in the set of potential replacement text strings based on the ranking.

10. The method of claim 1, further comprising displaying one or more text strings from the set of potential replacement text strings as suggestions for selection by the user to replace the input text string.

11. The method of claim 10, further comprising:
receiving the selection from the user; and
replacing the input text string with the selection.

12. The method of claim 1, wherein prior to receiving the input text string from the user, the method further comprises:
displaying an auto-completion configuration window to the user; and
receiving configuration parameters comprising a selection of business characteristics of businesses to be used in generating a commercial intent score for each potential replacement text string.

13. The method of claim 12, wherein the calculation of the commercial intent score for each potential replacement text string in the set is based on the received configuration parameters.

14. The method of claim 12, wherein displaying the auto-completion configuration window involves displaying a window with a list of configuration parameters for individual selection by the user.

15. A non-transitory computer-readable storage medium storing instructions that when executed by a computer cause the computer to perform a method for facilitating use of an auto-completion system, the method comprising:
receiving an input text string from a user;
determining a set of potential replacement text strings, wherein each potential replacement text string in the set can replace the input text string, wherein determining the set of potential replacement text strings for the input text string involves:
retrieving, from a database, prior financial transactions conducted with a set of businesses by the user;
analyzing the retrieved prior financial transactions; and
identifying, from the set of businesses, the set of potential replacement text strings, wherein each potential replacement text string in the set of potential replacement text strings is further based on establishing a level of lexicographic match of the potential replacement text string with the first text string;
calculating a commercial intent score for each potential replacement text string in the set, wherein the commercial intent score for each potential replacement text string in the set is based on calculating at least one of:
a normalized value Category(u,b) of the category of the business b for the user u;
a normalized value Size(u,b) of the size of the business b for the user u; and
a normalized value Distance(u,b) of the distance of the business b for the user u;
selecting a replacement text string from the set of potential replacement text strings based on the computed commercial intent score for each potential replacement text string in the set; and
displaying the replacement text string in place of the input text string to the user.

16. A system for facilitating use of an auto-completion system, comprising:
a memory;
a processor;
a receiving mechanism configured to receive a input text string from a user;
a determining mechanism configured to determine a set of potential replacement text strings wherein each potential replacement text string in the set can replace the input text string, wherein determining the set of potential replacement text strings for the input text string involves:
retrieving, from a database, prior financial transactions conducted with a set of businesses by the user;
analyzing the retrieved prior financial transactions; and
identifying, from the set of businesses, the set of potential replacement text strings, wherein each potential replacement text string in the set of potential replacement text strings is further based on establishing a level of lexicographic match of the potential replacement text string with the first text string;
a calculating mechanism configured to calculate a commercial intent score for each potential replacement text string in the set, wherein the commercial intent score for each potential replacement text string in the set is based on calculating at least one of:
a normalized value Category(u,b) of the category of the business b for the user u;
a normalized value Size(u,b) of the size of the business b for the user u; and
a normalized value Distance(u,b) of the distance of the business b for the user u;
a selecting mechanism configured to select a replacement text string from the set of potential replacement text strings based on the computed commercial intent score for each potential replacement text string in the set; and
a displaying mechanism configured to display the replacement text string in place of the input text string to the user.

* * * * *